April 30, 1940.  J. BRIX-HANSEN  2,199,038
COOLING DEVICE FOR FATS
Filed June 4, 1938
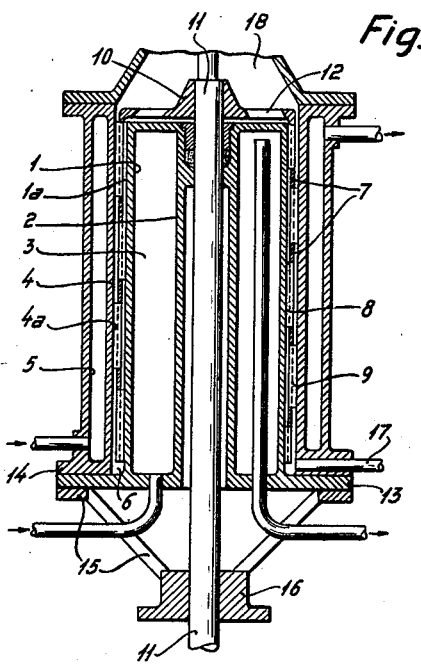
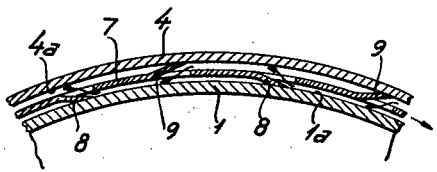
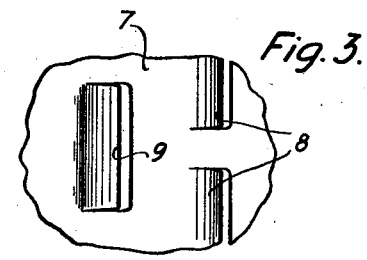
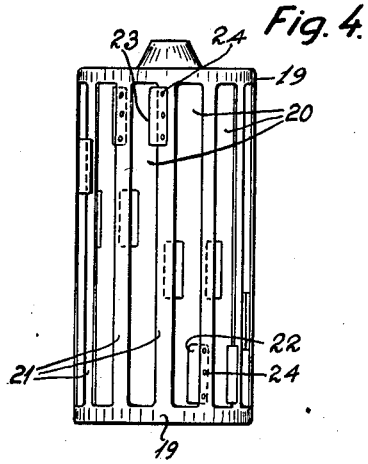
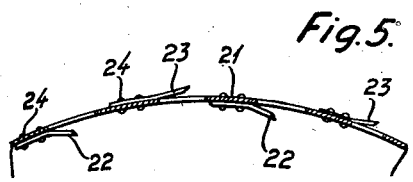
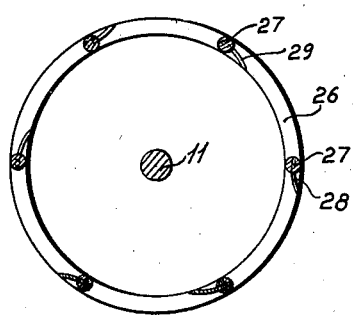
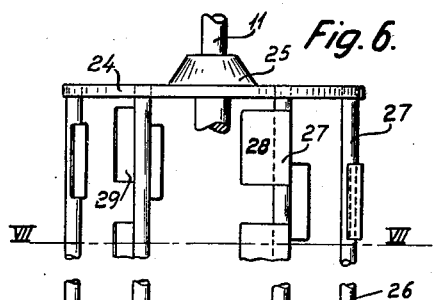
J. Brix-Hansen
Inventor
By: Glascock Downing & Seebold
Attys.

Patented Apr. 30, 1940

2,199,038

UNITED STATES PATENT OFFICE 2,199,038

COOLING DEVICE FOR FATS

John Brix-Hansen, Lyngby, Denmark

Application June 4, 1938, Serial No. 211,960
In Denmark June 18, 1937

4 Claims. (Cl. 62—114)

The present invention relates to improvements in cooling devices, particularly of the kind employed in the cooling of liquid fats, as for instance edible fats and fat emulsions, which during their cooling are transformed to a viscid, plastic or solid form. The present device comprises mainly two bodies of which the one is arranged around the other, and which has two concentrically or approximately concentrically disposed cooled rotation surfaces so spaced in relation to each other that there is formed an annular space between them, in which the substance to be cooled is conveyed by pressure, and in which there is disposed an operative member that actuates the substance.

During the conveyance of the substance over the cooled surfaces its content of heat is transmitted to these surfaces, and it is therefore of essential importance for an effective transmission of heat that as great a portion of the substance as possible contacts directly with the surfaces during its conveyance between them.

In devices of this kind of hitherto known construction it has already been proposed to employ mixing or conveying members that are rotated within the space between the cooled rotation surfaces of the bodies, and which members during their action agitate and/or convey the substance to be cooled between the surfaces with the object of producing an intimate contact between these surfaces and the substance. The cooling has, however, the effect that the fats are liable to form congealed layers settling on the cooling surfaces, which layer in even only a very thin form has a high heat-insulating effect and reduces the capacity of the device to an essential degree.

The said inconvenience is most prominent in the cooling of pure fats and emulsions containing a high percentage of fat, and under adverse conditions it may to some extent hinder the operation of the device, as it has been found that the agitation of the substance performed by the operative members of known construction between the cooling surfaces does not effectively prevent the formation of the said layers of fat settling on these surfaces.

The object of the present invention is to provide means by which this inconvenience is eliminated, and the invention is mainly characterized in that the rotating operative member disposed between the two bodies is provided with scraping members which during the conveyance of the substance to be cooled through the space between the said bodies actuates each of the rotation surfaces to the effect of scraping off the substance that has settled on the surfaces.

In this manner the formation of a settled layer of fat on the cooling surfaces is prevented, and the surfaces are continually and alternately cleaned of the cooled substance and again covered with new, non-cooled substance, while the substance scraped off is continually mixed with the main flow of substance that is being conveyed through the space, and this is by means of the scraping members gradually brought to contact with the cooling surfaces.

According to the invention the operative member is preferably constructed in the form of a drum that is rotatably journaled between the bodies, and on which drum each scraping member is arranged at one or several apertures formed in the drum. Some of the scrapers are bent inwardly to rest yieldingly against the innermost cooling surface, while other scrapers are bent outwardly to rest yieldingly against the outermost cooling surface, to the effect that the substance scraped off by means of the scrapers from the one surface is pressed through the adjacent apertures towards the other surface and vice versa. In this manner there is obtained an effective mixing of the substance.

The invention is furthermore characterized by several details which are described in the following description.

In the accompanying drawing the invention is illustrated in various modifications in connection with an upright cooling device, and Fig. 1 is an axial section through the device, Fig. 2 a cross section on a larger scale through a portion of the cooling surfaces and the part of the drum with scraping members thereon disposed between these surfaces, Fig. 3 a portion of the drum illustrated in Fig. 2 with scraping members formed therein, Fig. 4 a modified manner of construction of the drum and scraping members, Fig. 5 on a larger scale a cross section through a portion of a drum like that shown in Fig. 4 with scraping members attached thereto, Fig. 6 another modification of the drum, and Fig. 7 a sectional view on line VII—VII in Fig. 6.

With reference to Figs. 1, 2 and 3 of the drawing I indicates a hollow upright cylindrical body provided with an exterior rotation surface 1a and within which there is disposed an integral open central core 2. Between the core 2 and the interior surface of the body I there is formed a compartment 3 through which a cooling medium circulates. Concentrically in relation to the body I there is arranged another cylindrical body 4 having an interior rotation surface 4a. The body 4 is surrounded by a jacket 5, and between this and the body 4 a cooling medium circulates. Between the exterior surface 1a of the body and the interior surface 4a of the body 4 there is a comparatively narrow annular space 6 within which there is journaled a cylindrical drum 7 that carries a number of scraping members 8 and 9. As shown in Fig. 2 and 3 these scraping members are formed as knives produced by bending cut-out portions of the drum surface, and the knives are so disposed that those indicated by 8 are bent inwardly and rest with their scraping edge yieldingly against the exterior rotation surface 1a of the body 1, while the knives indicated by 9 are bent outwardly and rest with their scraping edge yieldingly against the interior surface 4a of the other body 4. At its upper end the drum 7 has an end plate 10 that is fixed to a shaft 11 journaled in a bearing in the upper end of the core 2, and which end plate has a number of perforations 12. At its lower end the body 1 is provided with a flange 13 by means of which it is connected to another flange 14 formed on the body 4. To the lower side of the flange 13 there is rigidly connected a frame 15 provided with a bearing 16 for the shaft 11.

In operation the liquid substance to be cooled is forced from the lower end of the device into the compartment or space 6 through an inlet pipe 17, while at the same time a cooling medium, for instance cold brine, circulates through the compartment 3 and through the space between the jacket 5 and the body 4. The drum is rotated by means of the shaft 11 in such a direction, that the scraping members carried by the drum are moved in the direction indicated by the arrow at the right end of Fig. 2, so that during their progression they scrape off any substance which during the flow of substance through the space 6 settles on the cooled rotation surfaces 1a and 4a. As indicated by the curved arrows in Fig. 2 the substance that is removed by means of the knives 8 is so displaced as to become mixed with the substance flowing along the surface 4a, while the substance removed by means of the knives 9 is so displaced as to become mixed with the substance flowing along the surface 1a. Preferably the knives are so disposed that the cooled surfaces are scraped throughout their entire extent. In this manner there is obtained a mixing of the substance during its flow through the space 6 so that practically the entire mass passing through the said space is for a shorter or longer time brought into direct contact with the cooled surfaces and is thus given an intense and uniform cooling. The substance conveyed between the surface 1a and the inner surface of the drum 7 is carried out of the drum through the apertures 12 in the end plate 10 and that conveyed between the surface 4a and the outer surface of the drum is carried out through the space between the end plate 10 and the frame 14.

The device described in the foregoing may form a part of a machine for subsequent treatment of the substance in question, which in this case after having left the space 6 is conveyed up to another section indicated by 18 of the machine, or the device may form an independent unit.

The scraper member disposed between the two rotation surfaces 1a and 4a within the space 6, is formed to conform with the space between these surfaces. The knives 8 and 9 may be made of any adequate material, and they may be attached to the member by means of screws, bolts or rivets as described in the following in order to allow their exchange when worn out.

In Figs. 4 and 5 there is shown a modified construction of a scraper member in the shape of a drum 19, in the wall of which there are formed a number of longitudinal apertures 20. To the parts 21 of the drum between the longitudinal apertures 20 a number of scraping members 22 and 23 are attached by means of studs 24. The position of the scraping members may be such that they either counteract or contribute to the conveyance of the substance through the device.

The apertures 20 provide the openings through which the substance may pass from the one cooled rotation surface to the other.

In another modification of the invention there is shown in Figs. 6 and 7 a drum-like rotation member constituting an upper plate 24, provided with a centrally disposed bush 25 by means of which the plate is attached to the shaft 11, and a lower ring 26, which plate and ring are interconnected by means of a number of peripherally disposed rods 27. To these rods there are attached scraper members 28 and 29 in such a manner that the scraper members are inserted within longitudinal slits formed in the rods 27 and fixed therein by means of suitable clamping means. The scraping members are so disposed that when the rotation member is inserted between the rotation surfaces 1a and 4a of a device as for instance that shown in Fig. 1, the scraping members 28 attached to one rod 27 rest yieldingly with their scraping edge against the surface 4a, while the scraping members 29 attached to the next rod 27 rest yieldingly with their scraping edge against the surface 1a. The substance under treatment passes from the one cooled rotation surface to the other through the spaces between the rods 27.

I declare that what I claim is:

1. In a cooling device for cooling liquid fats, for instance edible fats and fat emulsions, the combination of a cooling chamber, an open central core formed integral with said chamber and having a shaft journalled therein, means for circulating a cooling medium through said chamber, a hollow jacket surrounding the cooling chamber and forming therewith a narrow space, means for circulating a cooling medium through the interior of the hollow jacket, a drum fastened to said shaft and provided with a number of apertures in the surface thereof and being disposed for rotation within said narrow space, an end plate at the one extremity of the drum and provided with apertures, means for rotating the shaft, scraping members projecting from the inner side of the drum for coacting with the outer surface of the cooling chamber and other scraping members projecting from the outer surface of the drum for coacting with the inner surface of the hollow jacket.

2. A cooling device as claimed in claim 1, wherein the scraping members constitute incised circumferential portions of the drum surface, some of which are bent outwardly to coact with the inner surface of the hollow jacket, and others of which are bent inwardly from the drum surface to coact with the outer surface of the cooling chamber.

3. A cooling device as claimed in claim 1, wherein the drum surface constitutes a plurality of relatively spaced longitudinal elements, to which the scraping members are attached by means of fixing studs.

4. In a cooling device for cooling liquid fats, the combination of a cooling chamber, an open central core formed integral with said chamber and having a shaft journalled therein, means for circulating a cooling medium through said chamber, a hollow jacket surrounding the cooling chamber and forming therewith a narrow space, means for circulating a cooling medium through the interior of the hollow jacket, an end plate rotatably mounted on said shaft, a ring, rods interconnecting said end plate and said ring and disposed within said narrow space, scraping members affixed to some of said rods for coacting with the inner surface of the hollow jacket, and other scraping members affixed to other of said rods for coacting with the outer surface of the cooling chamber.

JOHN BRIX-HANSEN.